United States Patent
Schroeder et al.

(10) Patent No.: US 9,127,620 B2
(45) Date of Patent: Sep. 8, 2015

(54) METHODS AND SYSTEMS FOR MARKING A CYLINDER HEAD

(75) Inventors: Karl Schroeder, Columbus Grove, OH (US); Richard H. Snyder, II, Chillicothe, OH (US); Arland L. Glosette, Troy, OH (US); Donald Rethman, Jackson Center, OH (US); David M. Minton, Chickasaw, OH (US)

(73) Assignee: Honda Motor Co., Ltd., Tokyo (JP)

( * ) Notice: Subject to any disclaimer, the term of this patent is extended or adjusted under 35 U.S.C. 154(b) by 55 days.

(21) Appl. No.: 13/435,512

(22) Filed: Mar. 30, 2012

(65) Prior Publication Data
US 2013/0025104 A1     Jan. 31, 2013

Related U.S. Application Data

(60) Provisional application No. 61/513,308, filed on Jul. 29, 2011.

(51) Int. Cl.
*B22D 17/00* (2006.01)
*B23P 23/00* (2006.01)
*F02F 1/40* (2006.01)

(52) U.S. Cl.
CPC . *F02F 1/40* (2013.01); *B23P 23/00* (2013.01); *Y10T 29/49764* (2015.01); *Y10T 29/5124* (2015.01)

(58) Field of Classification Search
CPC .............. B23P 6/00; B23P 6/02; B23P 19/04; B23P 23/00; F01D 5/005; H05K 13/08; B29C 45/374; B29C 33/424; B22C 23/00; B22D 11/16; B22D 11/225; B22D 46/00; B22D 17/32; F02F 1/40; Y10T 29/49764; Y10T 29/5124
USPC ............ 29/407.04, 705, 709, 888.011; 101/4, 101/45, 48; 164/2, 4.1, 455
See application file for complete search history.

(56) References Cited

U.S. PATENT DOCUMENTS

| | | | |
|---|---|---|---|
| 5,725,253 A | 3/1998 | Salive et al. | |
| 7,363,957 B2 * | 4/2008 | Fulton et al. | 164/4.1 |
| 2001/0053949 A1 | 12/2001 | Howes et al. | |
| 2005/0285440 A1 * | 12/2005 | Bal | 301/63.101 |
| 2006/0272519 A1 * | 12/2006 | Uratani | 101/4 |
| 2007/0186417 A1 | 8/2007 | Smyth | |
| 2009/0320263 A1 | 12/2009 | Potje et al. | |
| 2010/0182150 A1 | 7/2010 | Edelstain | |
| 2011/0252986 A1 * | 10/2011 | Pitzer et al. | 101/45 |

OTHER PUBLICATIONS

Google—Definition of associate.*
Merriam-Webster Definition of associate.*

* cited by examiner

*Primary Examiner* — Alexander P Taousakis
*Assistant Examiner* — Lee A Holly
(74) *Attorney, Agent, or Firm* — Armstrong Teasdale LLP

(57) ABSTRACT

A system includes a first sensor positioned at a first location that senses a pallet identifier associated with a transfer pallet. A component is associated with the transfer pallet. A second sensor positioned at a second location remote from the first sensor senses the pallet identifier associated with the transfer pallet. A marking machine proximate to the second location marks the component with a component identifier associated with component unique birth data based on the pallet identifier.

11 Claims, 3 Drawing Sheets

METHODS AND SYSTEMS FOR MARKING A CYLINDER HEAD

CROSS-REFERENCE TO RELATED APPLICATIONS

This application claims priority to U.S. Provisional Patent Application No. 61/513,308 filed Jul. 29, 2011, which is hereby incorporated by reference in its entirety.

BACKGROUND

The present disclosure relates generally to marking components and, more particularly, to methods and systems for use in tracking a component positioned on a pallet.

At least some known components are marked with a unique identifier during their manufacture. The unique identifier may be associated with birth data when the component is fabricated and/or produced. The unique identifier may also be used for various purposes including model detection and/or traceability of the component.

In at least some methods of low pressure die casting, for example, a unique identifier is mechanically pin stamped to a component immediately after the component is cast to ensure that the component is accurately associated with the unique identifier. More specifically, each casting machine has a respective marking machine such that the components fabricated at each casting machine may be mechanically pin stamped at the respective marking machine immediately after the component is cast. However, maintaining a separate marking machine for each casting machine and/or integrating the marking machine with the casting machine may be difficult due to space constraints, safety restraints, and/or other environmental factors, for example. Moreover, integrating the marking machine with the casting machine may increase fabrication cycle time and/or increase downtime associated with manufacturing the component.

BRIEF DESCRIPTION

In one aspect, a method is provided for marking a component being fabricated. The method includes associating unique birth data with the component. A pallet identifier associated with a transfer pallet is sensed at a first sensor. The component is associated with the transfer pallet. The pallet identifier associated with the transfer pallet is sensed at a second sensor. The component is marked with a component identifier based on the pallet identifier. The component identifier is associated with the unique birth data.

In another aspect, a computing device is provided for use in marking a component. The computing device includes a processor and a computer-readable storage device having encoded thereon computer readable instructions that are executable by the processor to perform functions including associating unique birth data with the component. A pallet identifier associated with a transfer pallet is received from a first sensor. The component is associated with the transfer pallet. The pallet identifier associated with the transfer pallet is received from a second sensor. A component identifier is presented based on the pallet identifier. The component is marked with the component identifier. The component identifier is associated with the birth data.

In yet another aspect, a system is provided for use in marking a component. The system includes a first sensor configured to sense a pallet identifier associated with a transfer pallet. The first sensor is positioned at a first location. The component is associated with the transfer pallet. Unique birth data is associated with the component. A second sensor is configured to sense the pallet identifier associated with the transfer pallet. The second sensor is positioned at a second location remote from the first sensor. A marking machine is configured to mark the component with a component identifier based on the pallet identifier. The marking machine is proximate to the second location. The component identifier is associated with the birth data associated with the component.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The subject matter described herein relates generally to component marking and, more particularly, to methods and systems for use in tracking a pallet to enable a cast component positioned on the pallet to be marked. In one embodiment, a casting machine casts a component. In such an embodiment, a tracking machine collects birth data associated with the component and assigns the component to a particular pallet at a transfer station. The pallet is transferred to another location, wherein the tracking machine identifies the pallet. The tracking machine transmits, to a marking machine, a unique identifier associated with the birth data based on the identification of the pallet.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
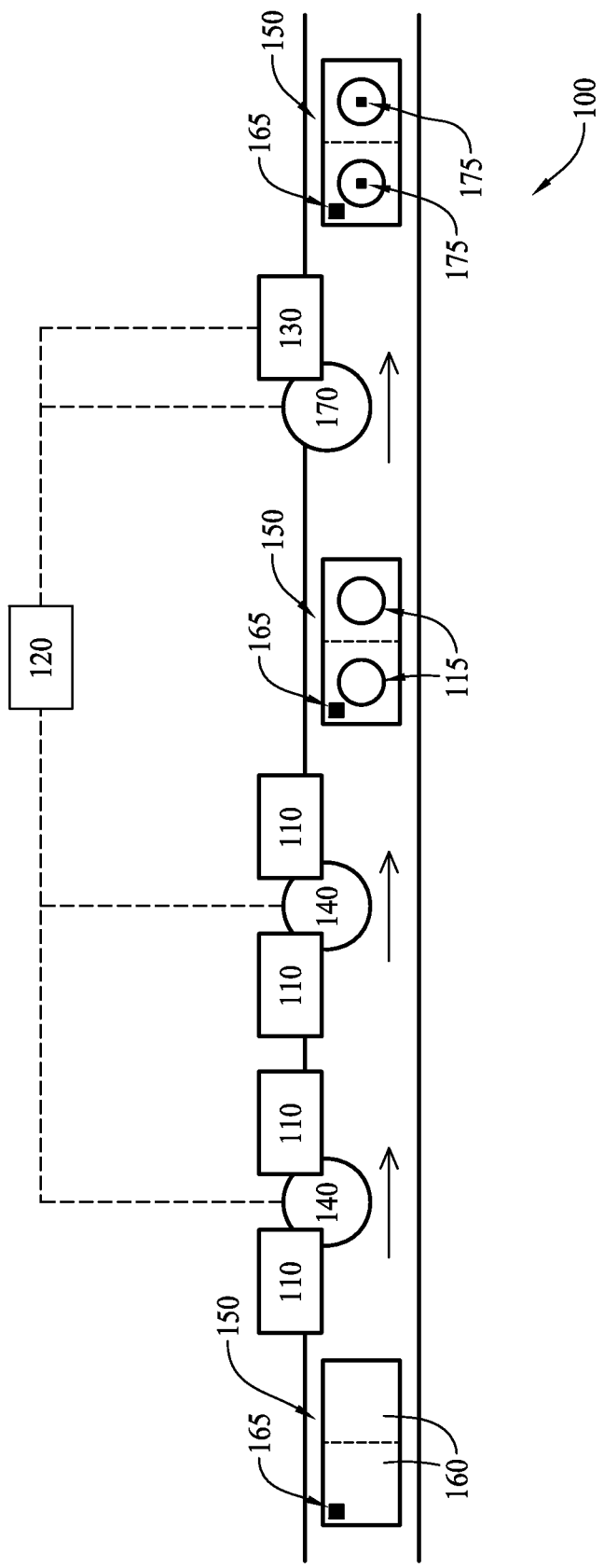
FIG. 1 is a schematic illustration of an exemplary plant that may be used to manufacture and/or fabricate a component.

FIG. 1 illustrates an exemplary plant 100 that includes at least one casting machine 110, a tracking machine 120, and a marking machine 130. In the exemplary embodiment, each casting machine 110 manufactures and/or fabricates a component 115. More specifically, in the exemplary embodiment, casting machine 110 is a low-pressure, die casting (LPDC) machine that casts component 115. Alternatively, casting machine 110 may be any machine used to manufacture and/or fabricate any component.

In the exemplary embodiment, tracking machine 120 tracks component 115 as component 115 is transferred between each casting machine 110 and marking machine 130. More specifically, in the exemplary embodiment, tracking machine 120 collects birth data associated with component 115 after component 115 is cast by casting machine 110. In the exemplary embodiment, the birth data associated with component 115 includes data at least indicative of a plant, a model, a version number, a machine number, a die number, a shot number, and/or a date of the casting. Alternatively, the birth data may include any other data and/or information that uniquely identifies a component manufactured and/or fabricated within plant 100.

In the exemplary embodiment, a first sensor or camera 140 is positioned in close proximity to casting machine 110. Moreover, in the exemplary embodiment, first camera 140 is coupled in communication with tracking machine 120. More specifically, in the exemplary embodiment, first camera 140 is positioned to detect and/or to identify components 115 manufactured and/or fabricated by casting machine 110 as component 115 is transferred between casting machine 110 and a cooling or transfer pallet 150. In at least some embodiments, transfer pallet 150 includes a predetermined number of uniquely identifiable portions 160. Accordingly, in the exemplary embodiment, tracking machine 120 is configured to uniquely identify each component based on which transfer pallet 150 component 115 was positioned on and/or which portion 160 of transfer pallet 150 component 115 was positioned on. In the exemplary embodiment, transfer pallet 150 includes a pallet identifier 165 that includes data, such as a bar code or a serial number, that uniquely identifies each transfer pallet 150. Alternatively, pallet identifier 165 may include any other data and/or information that uniquely identifies transfer pallet 150, and/or any device may be used to detect and/or identify transfer pallet 150.

Moreover, in the exemplary embodiment, a second sensor or camera 170 is positioned in close proximity to marking machine 130. Moreover, in the exemplary embodiment, second camera 170 is coupled in communication with tracking machine 120. More specifically, in the exemplary embodiment, second camera 170 is positioned to detect and/or to identify transfer pallet 150 as transfer pallet 150 is transferred between casting machine 110 and marking machine 130. Accordingly, in the exemplary embodiment, tracking machine 120 is configured to uniquely identify each component based on which transfer pallet 150 component 115 was positioned on and/or which portion 160 of transfer pallet 150 component 115 was positioned on.

In the exemplary embodiment, tracking machine 120 generates a component identifier 175, such as a bar code or a serial number, that uniquely identifies component 115. In the exemplary embodiment, tracking machine 120 transmits component identifier 175 to marking machine 130. Alternatively, marking machine 130 may generate component identifier 175, and transmit component identifier 175 to tracking machine 120. In one embodiment, component identifier 175 is generated based on the birth data. Accordingly, tracking machine 120 associates each component identifier 175 with a unique component and its associated birth data. Alternatively, component identifier 175 may be based on any data and/or information that enables tracking machine 120 to function as described herein.

In the exemplary embodiment, marking machine 130 marks component 115 with component identifier 175 such that component 115 is accurately associated with the birth data. In the exemplary embodiment, a central marking machine 130 is used to mark components 115 positioned on transfer pallets 150 transferred from more than one casting machine 110. Alternatively, any number of marking machines 130 may be used to mark any number of components manufactured and/or fabricated from any number of casting machines 110.

Figure 2:
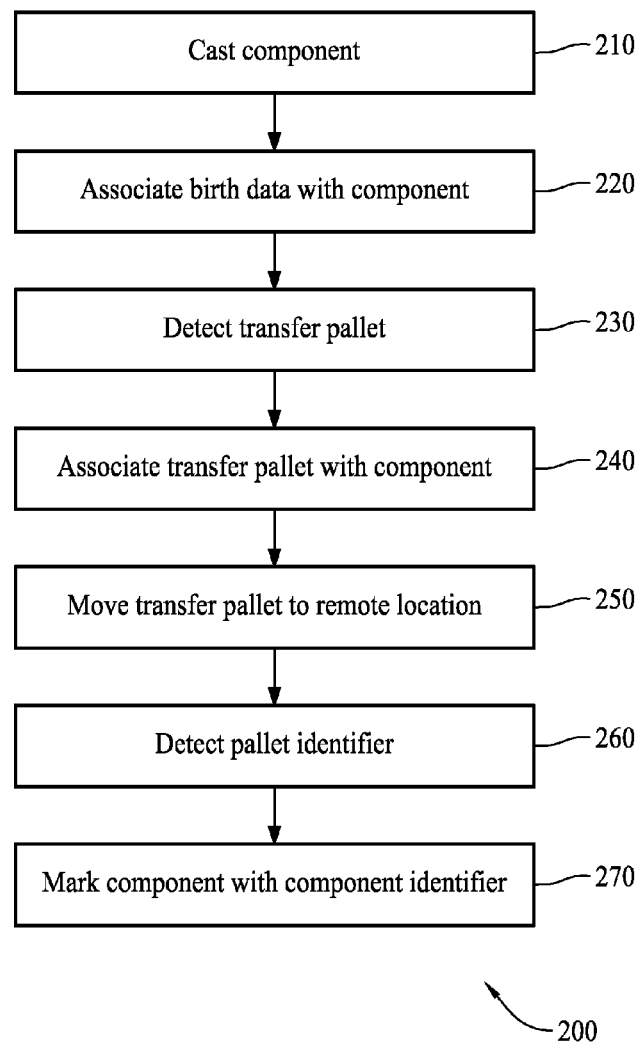
FIG. 2 is a flow chart of an exemplary method that may be implemented to mark a component manufactured and/or fabricated in the plant shown in FIG. 1.

FIG. 2 is a flow chart of an exemplary method 200 that may be implemented for use in tracking a component, such as component 115 (shown in FIG. 1). In the exemplary embodiment, method 200 is implemented in a continuous and automated process that is performed at a single location, such as substantially within the same building. Alternatively, method 200 may be performed in any number of steps and/or locations that enable plant 100 (shown in FIG. 1) to function as described herein.

In the exemplary embodiment, method 200 includes casting 210 component 115, such as a cylinder head, using casting machine 110 (shown in FIG. 1). In the exemplary embodiment, birth data is associated 220 with component 115. Birth data may include, for example, data indicative of a plant, a model, a version number, a machine number, a die number, a shot number, a date, and/or any other data associated with component 115 and that uniquely identifies component 115 based on the birth data. In the exemplary embodiment, birth data may be collected using first camera 140 (shown in FIG. 1) to identify or monitor casting machine 110 and/or component 115 at fabrication or birth.

In the exemplary embodiment, first camera 140 senses and/or detects 230 a transfer pallet 150 (shown in FIG. 1) on which component 115 is positioned after component 115 is manufactured and/or fabricated. More specifically, first camera 140 senses or detects 230 pallet identifier 165 (shown in FIG. 1) associated with transfer pallet 150 and/or portion 160 (shown in FIG. 1) of transfer pallet 150. In the exemplary embodiment, tracking machine 120 then associates 240 the identified transfer pallet 150 and/or portion 160 with component 115 positioned on transfer pallet 150 and/or pallet portion 160. In the exemplary embodiment, tracking machine 120 receives data and/or information associated with pallet identifier 165 that uniquely identifies transfer pallet 150 and/or portion 160 on which component 115 is positioned. For example, first camera 140 may sense or detect 230 pallet identifier 165 and transmit data and/or information associated with pallet identifier 165 to tracking machine 120. Pallet identifier 165 enables tracking machine 120 to track each transfer pallet 150 or, more specifically, each component, through the entire manufacturing process.

In the exemplary embodiment, transfer pallet 150 is then transferred or moved 250 to a location remote from casting machine 110. For example, in the exemplary embodiment, transfer pallet 150 is positioned on a conveyor belt that moves transfer pallet 150 towards marking machine 130. In one embodiment, the conveyer belt may be used to selectively move transfer pallet 150 through a pre-finish line, a heat treatment section, and/or a finish line and final inspection section.

In the exemplary embodiment, second camera 170 (shown in FIG. 1) senses or detects 260 pallet identifier 165, and tracking machine 120 transmits, to marking machine 130, birth data associated with component 115 positioned on the identified pallet identifier 165 and/or a component identifier 175 (shown in FIG. 1) associated with component 115. For example, second camera 170 may sense or detect 260 pallet identifier 165 and transmit data and/or information associated with component 115 positioned on the associated transfer pallet 150 and/or location 160 to tracking machine 120. Pallet identifier 165 enables marking machine 130 to mark each component with an accurate component identifier 175.

In the exemplary embodiment, marking machine 130 automatically marks 280 component 115 with component identifier 175 to uniquely identify component 115. As such, component 115 is accurately associated with the birth data.

Figure 3:
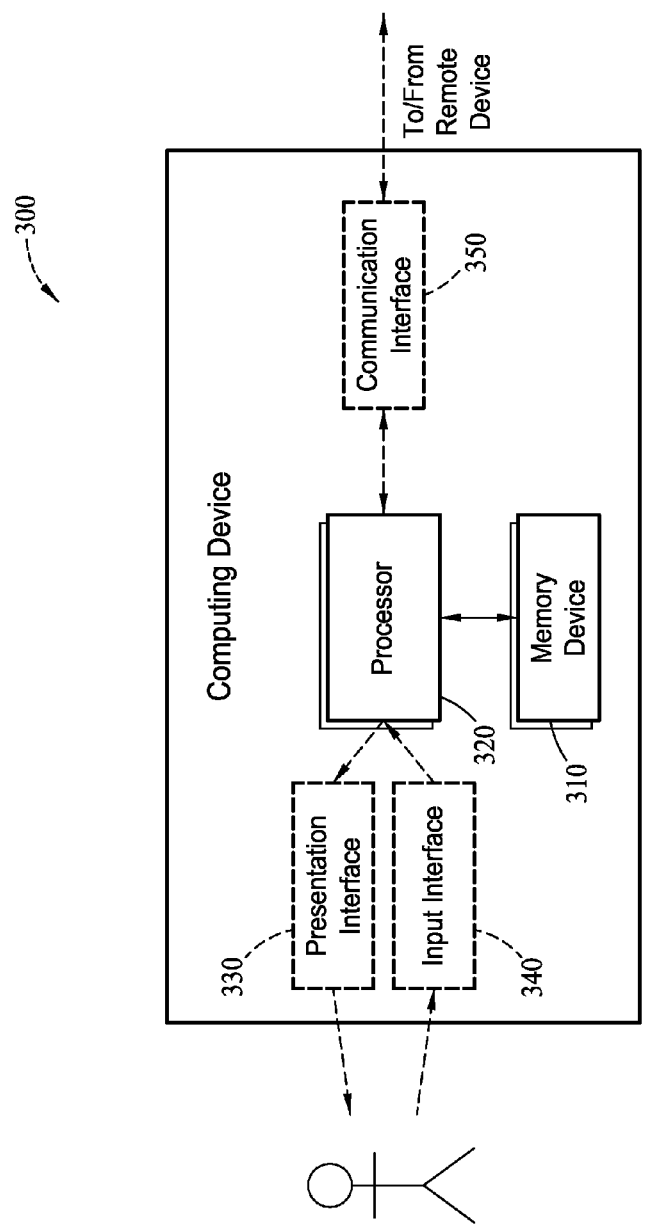
FIG. 3 is a block diagram of an exemplary computing device that may be used to track a component using the method shown in FIG. 2.

FIG. 3 is a block diagram of an exemplary computing device 300 that may be used with tracking machine 120 (shown in FIG. 1). In the exemplary embodiment, computing device 300 facilitates maintaining data and/or information associated with birth data, pallet identifiers 165 (shown in FIG. 1), and/or component identifiers 175 (shown in FIG. 1). More specifically, in the exemplary embodiment, computing device 300 enables marking machine 130 (shown in FIG. 1) to accurately mark a component with a unique component identifier 175 that is associated with birth data of component 115 (shown in FIG. 1).

In the exemplary embodiment, computing device 300 includes a memory device 310 and a processor 320 that is coupled to memory device 310 for executing programmed instructions. Processor 320 may include one or more processing units (e.g., in a multi-core configuration). In one embodiment, executable instructions and/or biological data are stored in memory device 310. For example, in the exemplary embodiment, memory device 310 stores software for use in converting a mechanical stress and/or vibration to a signal. Computing device 300 is programmable to perform one or more operations described herein by programming memory device 310 and/or processor 320. For example, processor 320 may be programmed by encoding an operation as one or more executable instructions and providing the executable instructions in memory device 310.

Processor 320 may include, but is not limited to, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Memory device 310, as described herein, is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, executable instructions, biological data, and/or any other type of data suitable for use with the systems described herein.

In the exemplary embodiment, computing device 300 includes a presentation interface 330 that is coupled to processor 320. Presentation interface 330 outputs and/or displays information, such as, but not limited to, biological data and/or any other type of data to a user (not shown). For example, presentation interface 330 may include a display adapter (not shown) that is coupled to a display device (not shown), such as a cathode ray tube (CRT), a liquid crystal display (LCD), a light-emitting diode (LED) display, an organic LED (OLED) display, and/or an "electronic ink" display.

In the exemplary embodiment, computing device 300 includes an input interface 340 that receives input from a user. For example, input interface 340 receives instructions for controlling an operation of tracking machine 120 and/or any other type of data suitable for use with the systems described herein. In the exemplary embodiment, input interface 340 is coupled to processor 320 and may include, for example, a keyboard, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 330 and as input interface 340.

In the exemplary embodiment, computing device 300 includes a communication interface 350 coupled to memory device 310 and/or processor 320. Communication interface 350 is coupled in communication with a remote device, such as tracking machine 120, marking machine 130, first camera 140, second camera 170, and/or another computing device 300. For example, communication interface 350 may include, without limitation, a wired network adapter, a wireless network adapter, and/or a mobile telecommunications adapter.

The subject matter described herein enables a centrally-located marking machine to accurately mark components, such as cylinder heads, produced across multiple casting machines. More specifically, the subject matter described herein enables accurate management of a plurality of components produced across multiple casting machines such that each component may be accurately and uniquely identified at a location that is downstream from the casting machines. As such, the embodiments described herein facilitate decreasing a number of marking machines and, thus, reducing a maintenance cost associated with the marking machine. Moreover, the embodiments described herein facilitate decreasing cycle time and/or decreasing downtime associated with manufacturing the cylinder heads.

Exemplary embodiments of methods and systems for marking components are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for marking a component using a marking machine coupled to a computing device coupled to a plurality of first sensors and a second sensor, the computing device including a processor, said method comprising:
casting a first component using a first casting machine;
associating the first component with a first transfer pallet on which the first component is positioned, wherein associating the first component with the first transfer pallet comprises:

sensing, using a first one of the plurality of first sensors proximate to the first casting machine, at least one of the first casting machine and the first component, wherein the first component is associated with unique birth data; and sensing, using the first one of the plurality of first sensors proximate to the first casting machine, a first pallet identifier associated with the first transfer pallet;

transferring the first transfer pallet from the first one of the plurality of first sensors proximate to the first casting machine towards the second sensor proximate to the marking machine, wherein the first one of the plurality of first sensors and the first casting machine are remote from the second sensor and the marking machine;

sensing, using the second sensor proximate to the marking machine, the first pallet identifier associated with the first transfer pallet;

determining, by the processor, a component identifier associated with the unique birth data based on the first pallet identifier;

marking, by the marking machine, the first component with the component identifier;

casting a second component using a second casting machine;

associating the second component with a second transfer pallet, wherein associating the second component with the second transfer pallet comprises:

sensing, at a second one of the plurality of first sensors proximate to the second casting machine, at least one of the second casting machine and the second component, wherein the second component is associated with unique birth data; and sensing, at the second one of the plurality of first sensors proximate to the second casting machine, a second pallet identifier associated with the second transfer pallet on which the second component is positioned;

transferring the second transfer pallet from the second one of the plurality of first sensors proximate to the second casting machine towards the second sensor proximate to the marking machine, wherein the second one of the plurality of first sensors and the second casting machine are remote from the second sensor and the marking machine and from the first one of the plurality of first sensors and the first casting machine; and sensing, at the second sensor proximate to the marking machine, the second pallet identifier associated with the second transfer pallet.

2. A method in accordance with claim 1, wherein sensing, using the first one of the plurality of first sensors proximate to the first casting machine, the first pallet identifier further comprises identifying a relative portion of the first transfer pallet on which the first component is positioned.

3. A method in accordance with claim 2, wherein sensing, using the second sensor proximate to the marking machine, the first pallet identifier further comprises identifying the first component based on the portion of the first transfer pallet.

4. A method in accordance with claim 1 further comprising generating the component identifier based on the unique birth data.

5. A method in accordance with claim 1, wherein the unique birth data is associated with the fabrication of the first component.

6. A method in accordance with claim 1, further comprising:

determining, by the processor, a second component identifier associated with the unique birth data of the second component based on the second pallet identifier; and marking, by the marking machine, the second component with the second component identifier.

7. A method for marking a component using a marking machine coupled to a computing device coupled to a plurality of sensors, the computing device including a processor, said method comprising:

providing a plurality of casting machines;

providing a tracking machine for collecting birth data of components cast by the plurality of casting machines;

providing a component marking machine for marking components cast by the plurality of casting machines;

providing a first transfer pallet with a first pallet identifier;

providing a second transfer pallet with a second pallet identifier;

casting a first component at a first casting machine of the plurality of the casting machines, and collecting, with the tracking machine, unique birth data associated with the first component;

casting a second component at a second casting machine of the plurality of casting machines, and collecting, with the tracking machine, unique birth data associated with the second component;

detecting the first pallet identifier;

associating, with the tracking machine, the first component with the identified first transfer pallet on which the first component is positioned;

detecting the second pallet identifier;

associating, with the tracking machine, the second component with the identified second transfer pallet on which the second component is positioned;

transferring the first transfer pallet to the marking machine;

transferring the second transfer pallet to the marking machine;

detecting, at the marking machine, the first pallet identifier associated with the first transfer pallet;

marking, by the marking machine, the first component with a component identifier associated with the birth data of the first component;

detecting, at the marking machine, the second pallet identifier associated with the second transfer pallet; and marking, by the marking machine, the second component with a component identifier associated with the birth data of the second component.

8. A method in accordance with claim 7, wherein detecting the first pallet identifier comprises detecting, using a first sensor proximate to the first casting machine, the first pallet identifier.

9. A method in accordance with claim 8, wherein detecting the second pallet identifier comprises detecting, using a second sensor proximate to the second casting machine, the second pallet identifier.

10. A method in accordance with claim 9, wherein detecting, at the marking machine, the first pallet identifier associated with the first transfer pallet comprises detecting, using a third sensor proximate to the marking machine, the first pallet identifier associated with the first transfer pallet.

11. A method in accordance with claim 10, wherein the first sensor, the second sensor, and the third sensor are cameras.

* * * * *